United States Patent [19]

Pritchard et al.

[11] Patent Number: 5,160,112

[45] Date of Patent: Nov. 3, 1992

[54] MOVING MIRROR CARRIAGE

[76] Inventors: Anton E. Pritchard; James A. Pritchard, both of, P.O. Box 17, Norfolk, Mass. 02056

[21] Appl. No.: 744,266

[22] Filed: Aug. 13, 1991

[51] Int. Cl.⁵ ............................................. A47G 1/16
[52] U.S. Cl. ................................. 248/604; 248/475.1; 248/480; 248/488; 359/871
[58] Field of Search .............. 248/469, 474, 475.1, 248/476, 479, 480, 488, 603, 604; 359/871, 872, 881, 808, 811, 813, 819

[56] References Cited

U.S. PATENT DOCUMENTS

| | | | |
|---|---|---|---|
| 1,653,109 | 12/1927 | Krietemeyer | 248/604 X |
| 2,070,018 | 2/1937 | Mecklenburger | 248/603 X |
| 2,936,140 | 5/1960 | Copeland | 248/604 |
| 3,334,959 | 8/1967 | Walsh | 248/488 X |
| 3,970,373 | 7/1976 | Pledger | 359/872 X |
| 3,989,358 | 11/1976 | Melmoth | 359/819 X |
| 4,268,123 | 5/1981 | Mesco | 248/488 |
| 4,763,991 | 8/1988 | Klotz, Jr. | 359/872 X |
| 4,789,125 | 12/1988 | Pritchard et al. | 248/486 X |
| 4,929,054 | 5/1990 | Ahmad et al. | 248/603 X |

*Primary Examiner*—Carl D. Friedman
*Assistant Examiner*—Derek J. Berger
*Attorney, Agent, or Firm*—John E. Toupal; Harold G. Jarcho

[57] ABSTRACT

A system for constraining a moving device to parallel plane translational movement, the system including a base; a frame fixed to the base and including frame portions disposed at the periphery of a region; a movable device disposed in the region; and a plurality of coupling elements connected between the frame portions and the movable device so as to provide support thereof, each of the coupling elements being capable of bending motion and incapable of twisting motion so as to guide movement of the movable device along a path including a series of planes all oriented substantially parallel to each other. The coupling elements restrict movement of the device to a desired sequential parallel plane path.

25 Claims, 4 Drawing Sheets

MOVING MIRROR CARRIAGE

BACKGROUND OF THE INVENTION

This invention relates generally to a moving carriage and, more particularly, to a carriage for providing high precision parallel plane translational movement to a device such as a mirror in a Michelson interferometer.

During use of a Michelson interferometer, a mirror is translated through planes which are at least approximately parallel to each other. The accuracy provided by the instrument is directly related to the degree of parallelism in the movement of the mirror. Precision bearing way systems are commonly employed to achieve the parallel translation of the mirror. Such bearing way systems commonly employ sliding flat surfaces or circular rolling elements either of which require lubrication. In many cases, such as, for example, cryogenic applications, the requirement for lubrication is an undesirable restriction.

Other known types of Michelson interferometer carriage systems utilize linkages as an alternative to conventional way systems. For example, hinged parallelograms have been used to provide parallel and nearly linear translation of a movable mirror. Such linkage systems are disclosed, for example, in U.S. Pat. No. 4,789,125. By employing crossed flat spring pivots, known as flex pivots, lubrication requirements can be alleviated in a hinged parallelogram carriage system. However, such linkages generally introduce more tilt into the movable mirror motion than do precision ground way systems.

The object of this invention, therefore, is to provide an improved Michelson interferometer mirror carriage that will provide highly accurate parallel plane translational mirror motion without a requirement for lubrication.

SUMMARY OF THE INVENTION

The invention is a system for constraining a moving device to parallel plane translational movement, the system including a base; a frame fixed to the base and including frame portions disposed at the periphery of a region; a movable device disposed in the region; and a plurality of coupling elements connected between the frame portions and the movable device so as to provide support thereof, each of the coupling elements being capable of bending motion and incapable of twisting motion so as to prevent angular movement of said movable means about either of at least two mutually perpendicular spatial axes and thereby guide movement of the movable device along a path including a series of planes all oriented substantially parallel to each other. The coupling elements restrict movement of the device to a desired sequential parallel plane path.

In one embodiment of the invention, the frame portions surround the region and, in another embodiment of the invention, the region surrounds the frame portions.

According to one feature of the invention, the coupling elements comprise element portions extending in a plane parallel to the series of planes and capable of elongation and contraction. The elongatable and contracter elements allow transverse movement of the device.

According to another feature of the invention, each of the coupling elements comprises a bellows element having a longitudinal axis and being capable of bending motion and incapable of twisting motion along the longitudinal axis. Bellows provide the desired operational characteristics for the coupling elements.

According to other features of the invention each longitudinal axis of each bellows element is aligned with the plane parallel to the series of planes, and the longitudinal axes of two of the bellows elements form an angle less than 180°. This arrangement prevents undesired movement of the device.

According to yet other features of the invention, the bellows coupling elements comprise at least three coupling elements arranged in an array symmetrical with respect to the region. This arrangement provides highly stable support for the moving device.

According to a further feature of the invention, the system includes a drive mechanism coupled to the movable device and a drive coupling between the drive mechanism and the movable device. The drive coupling is adapted to uncouple tilt from the drive mechanism into the movable device.

In one embodiment of the invention, the drive coupling is a universal joint, and, in another embodiment of the invention, the drive coupling is a ball and socket joint.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
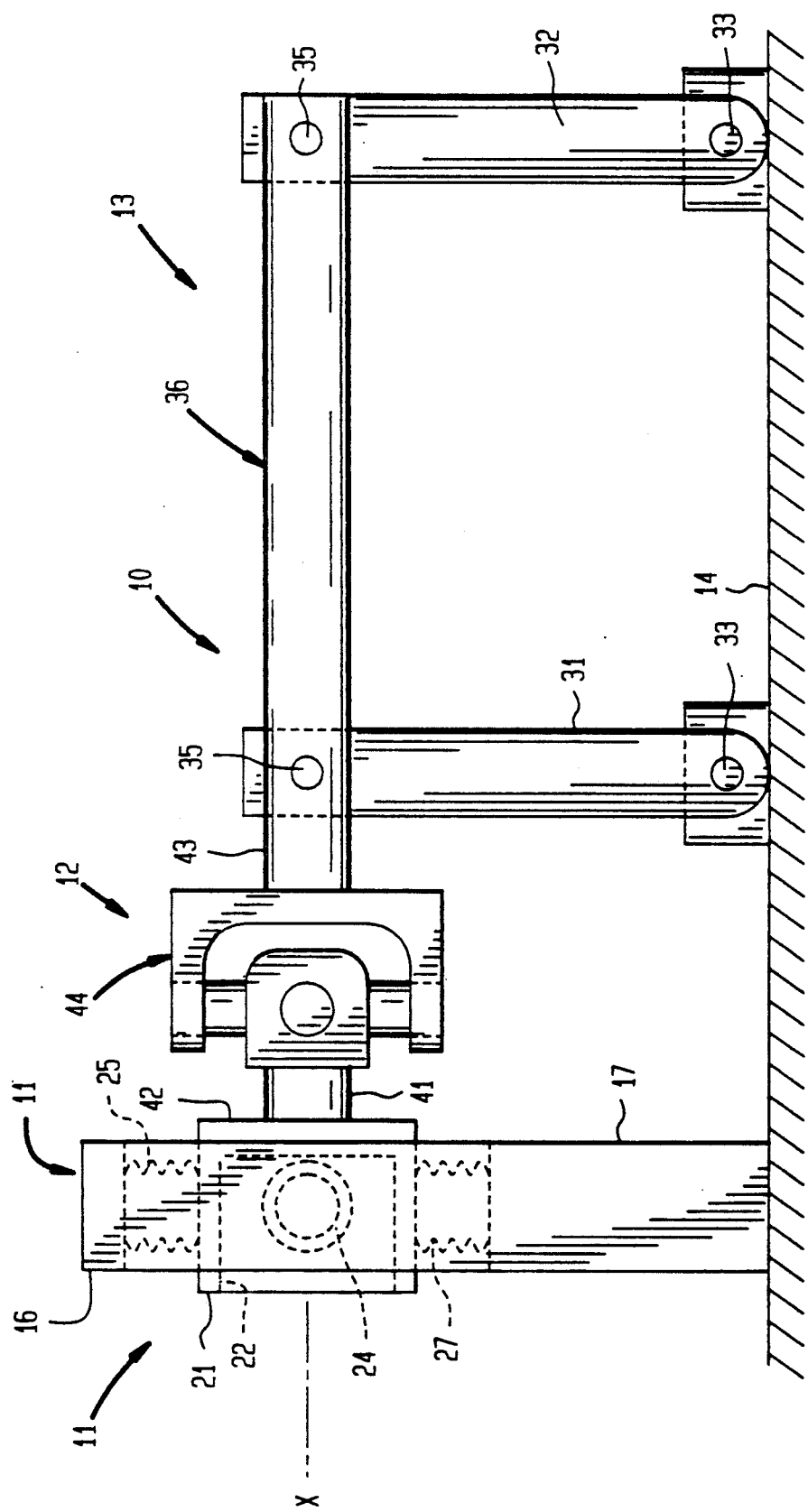
FIG. 1 is a side elevational view of a carriage according to the invention.
Figure 2:
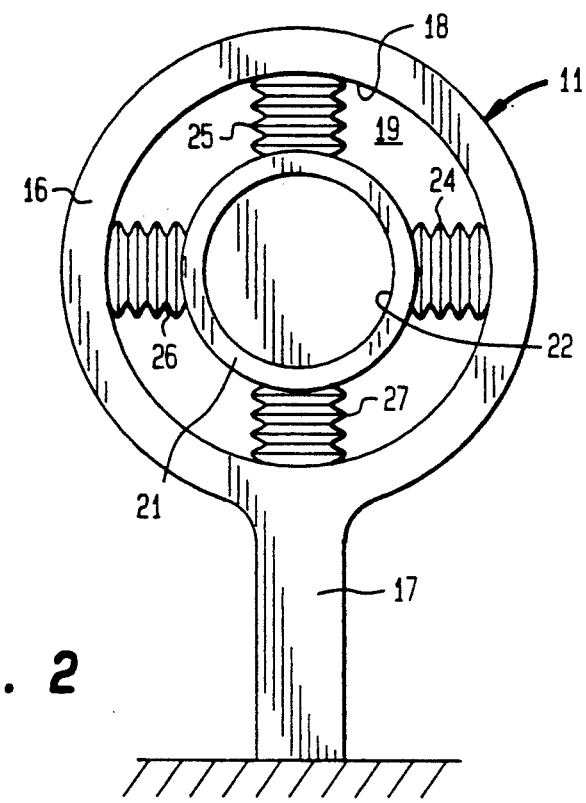
FIG. 2 is a front elevational view of the carriage shown in FIG. 1.

Illustrated in FIGS. 1 and 2 is a movement control system 10 including a carriage 11 for providing parallel plane translation for a mirror of a Michelson interferometer. Coupled to the carriage 11 by a drive coupling 12 is a drive assembly 13. Both the carriage 11 and the drive assembly 13 are supported by a base 14.

The carriage 11 includes a circular frame portion 16 supported above the base 14 by a pedestal portion 17. Inner portions of the annular frame 16 define an outer periphery 18 of a planar region 19 (FIG. 2). Disposed within the planar region 19 is a movable support dish 21 having a central cavity 22 adapted to receive a mirror (not shown) of a Michelson interferometer.

The support dish 21 is supported from the frame 16 by a plurality of bellows coupling elements 24-27 connected therebetween. Bellows elements suitable for use in the carriage 11 include, for example, an electroformed nickel bellows manufactured by Servometer of Cedar Grove, N.J. Each of the bellows elements 24-27 has a longitudinal axis extending along a path in a given plane defined by the planar region 19 and extending radially between the support dish 21 and the circular frame 16. As shown in FIG. 2, the bellows elements are arranged in an array symmetrical with respect to the planar region 19, and the axes of each adjacent pair of the bellows elements 24-27 form an angle less than 180°.

The drive assembly 13 includes a pair of vertical legs 31, 32 each having one end pivotally connected to the base 14 by a pivot 33. Opposite ends of the legs 31, 32 are connected by pivots 35 to a horizontally oriented drive rod 36. The drive assembly 13 is conventional and does not per se form a part of this invention. Details regarding the construction and operation of the drive assembly 13 are disclosed, for example, in above noted U.S. Pat. No. 4,789,125.

The drive coupling 12 includes an appendage 41 extending horizontally from a rear surface 42 of the support dish 21 and a portion 43 of the drive rod 36 extending horizontally from the pivot point 35. Joining the appendage 41 and the drive rod portion 43 is a universal joint 44.

During operation of the movement control system 10, pivotal movement between the leg linkages 31 and 32 and the drive rod 36 linkage of the drive assembly 13 are introduced by conventional means (not shown). Resultant substantially horizontal movement of the drive rod 36 is transmitted to the support dish 21 of the carriage 11 by the drive coupling 12. Since the flexible bellows elements 24-27 are capable of bending motion, but are incapable of twisting motion about their longitudinal axis, the movement of the support dish 21 is restrained to a sequential series of mutually parallel planes all parallel to the plane defined by the longitudinal axis of the bellows elements 24-27. However, being capable of bending, the bellows elements 24-27 do not restrict motion of the support dish 21 in either vertical or horizontal directions. The universal joint 44 uncouples the support dish 21 from any tilt inherent in the movement of the drive rod 36 and also provides support in the vertical and horizontal directions. The universal joint 44 does, however, rigidly couple any rotation of the rod 36 about its longitudinal axis into the support dish 21. Since the bellows elements 24-27 do not prevent such rotation of the support dish 21, any such rotation of drive rod 36 would produce an undesired movement of the dish 21.

When a parallelogram linkage such as the drive assembly 13 is realized as a real physical structure, it exists in three dimensions rather than two. In the construction of such real devices, it is usually difficult, if not impossible, to have all dimensions perfect. In movement such a real linkage therefore warps and buckles a certain amount. This warping and buckling movement can produce a small rotation of the real counterpart of the rod 36. Now, if a plane mirror is secured within the cavity 22 of support dish 21 so that the mirror surface is oriented not parallel to the plane defined by the bellows' longitudinal axes, and the mirror then rotates about any axis perpendicular to the plane defined by the bellows' longitudinal axes, the mirror surface will not remain within a family of parallel planes. Since no actual tipping of the support dish 21 can occur, such tipping being prevented by the bellows, this phenomenon may be called a virtual tilt. Thus, rotation of rod 36 could cause this virtual tilt phenomenon, which, from an optical standpoint, is indistinguishable from real tilt and is therefore an unwanted movement.

If the mirror surface is oriented parallel to the plane defined by the bellows' longitudinal axes, or the mirror does not twist, then this virtual tilt, so called, does not occur. Generally, the mirror surface can be oriented sufficiently parallel to the plane defined by the bellows' longitudinal axes, or the drive assembly can be made sufficiently accurately that twisting is minimal, so that this virtual tilt will be no problem. In those cases, the embodiment 11 of FIGS. 1 and 2 is suitable. However, in certain highly demanding applications, any possibility of rotation responsible for the virtual tilt should be limited or eliminated. The embodiments shown in FIGS. 3-6 meet that requirement.

Figure 3:
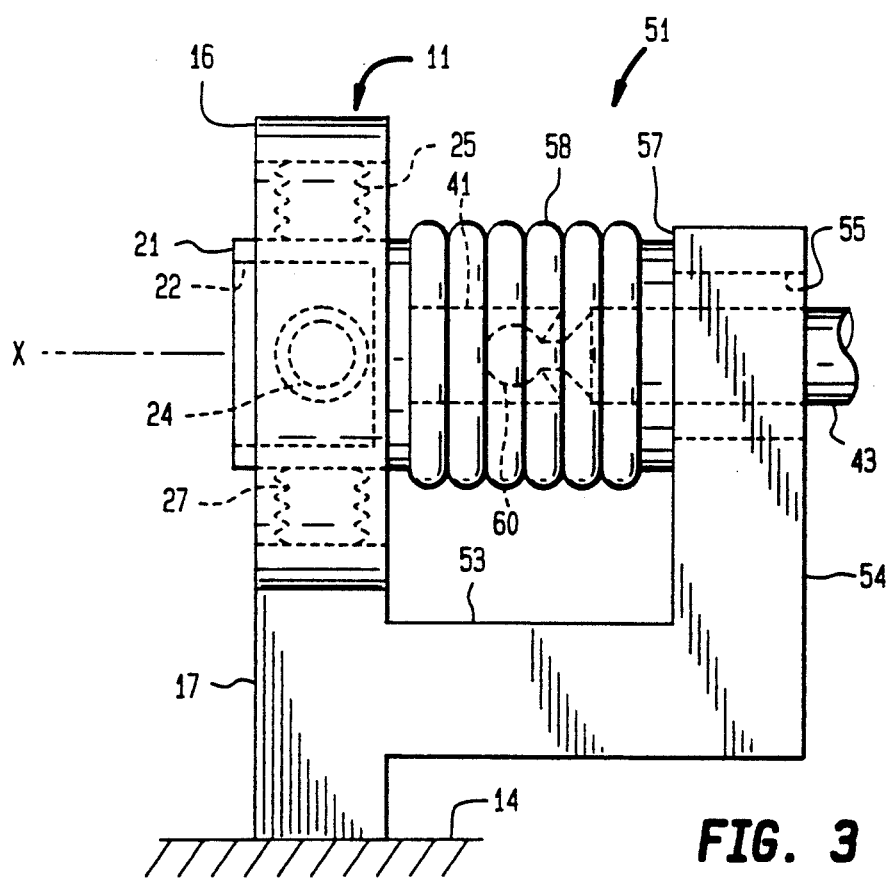
FIG. 3 is a side elevational view of another embodiment of the invention.

FIG. 3 illustrates an embodiment 51 in which portions identical to those of the embodiment shown in FIGS. 1 and 2 bear identical reference numerals. An arm having a horizontal portion 53 has one end connected to the pedestal portion 17 and an opposite end fixed to a vertical arm portion 54. An opening 55 in the vertical arm portion 54 receives and allows movement of the drive rod 36 of the drive assembly 13. Secured between the rear surface 42 of the support dish 21 and an annular surface 57 of the vertical arm portion 54 surrounding the opening 55 is a bellows element 58. A ball and socket joint 60 disposed within the bellows 58 connects the drive rod portion 43 to the appendage 41.

The operation of the embodiment 51 is similar to that described above for the embodiment 10. Since the bellows 58 is capable of bending motion and elongation and contraction along its longitudinal axis, vertical and horizontal movement of the support dish 21 through a series of parallel planes is permitted. However, since the bellows 58 is incapable of twisting motion about its longitudinal axis, while the ball and socket joint 60 can twist and tilt about any axis, the support dish 21 is uncoupled from the angular movement of the rod 43. In this way, angular movement of the support dish 21 along its path of movement is prevented.

Figure 4:
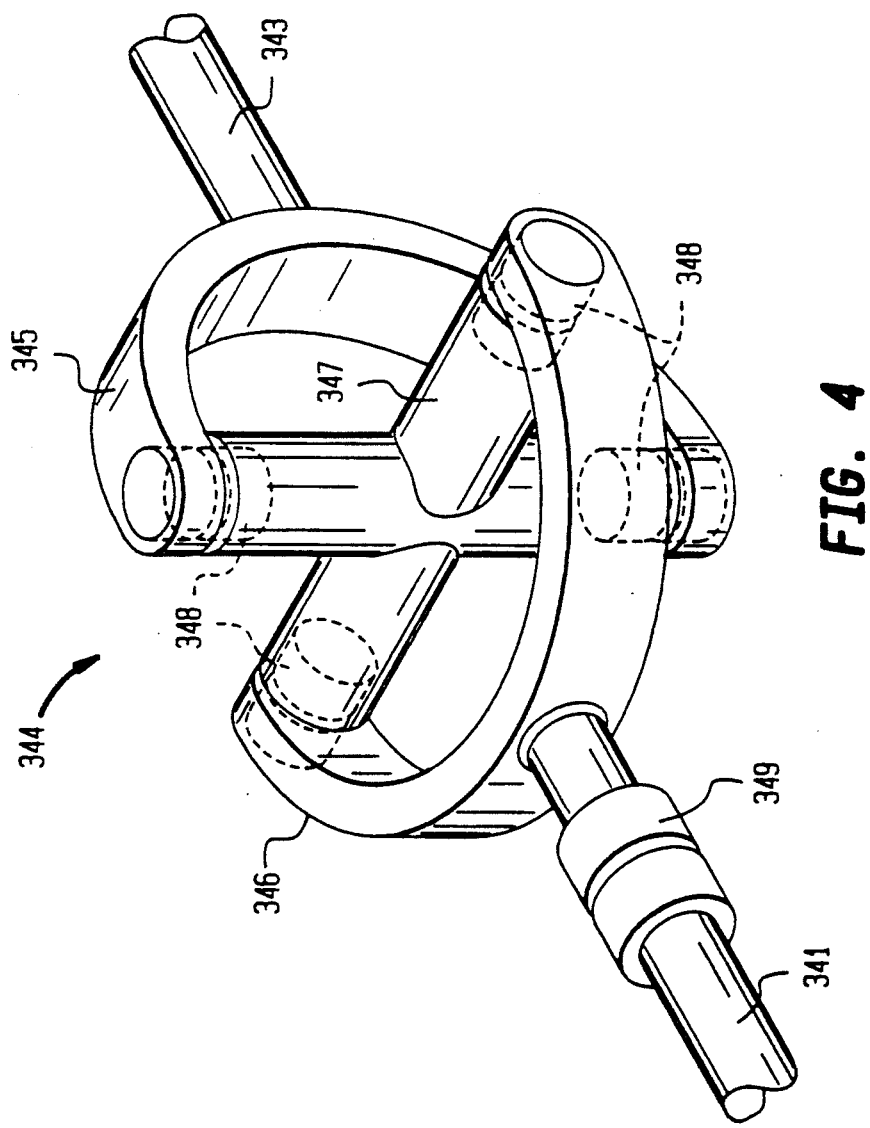
FIG. 4 is a perspective view of a serial combination of a universal joint and an axially twisting bearing.

To eliminate any requirement for lubrication, the ball and socket joint 60 may be replaced by the coupling shown in FIG. 4. This coupling is a serial combination 344 of a universal joint and an axially twisting bearing, which can be used in embodiment 51 in place of the ball and socket joint and which requires no lubrication. Forming the serial combination 344 are a pair of yoke members 345, 346 coupled to a cross-member 347 by crossed flat spring flex pivots 348. The yoke member 345 is connected to the portion 343, while the yoke member 346 is coupled to the appendage 341 by another crossed flat spring flex pivot 349. Because of the flex pivots 348, 349, the serial combination 344 desirably provides swiveling motion similar to that available from a ball and socket joint without the friction normally found in a ball and socket joint.

Figure 5:
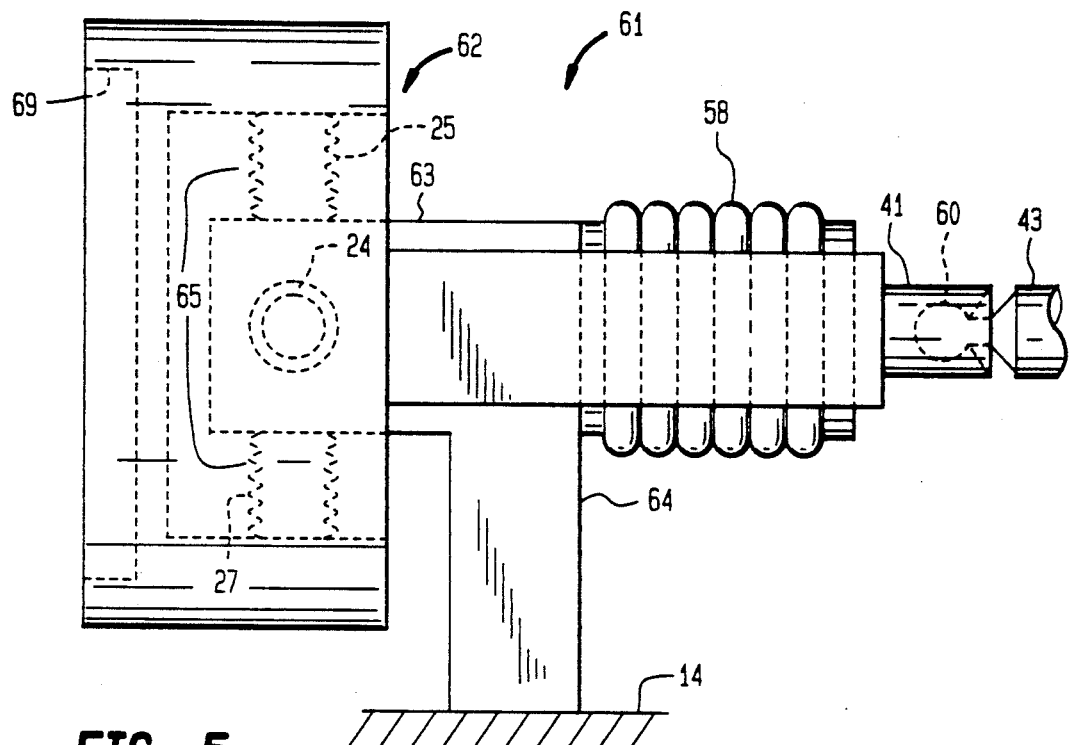
FIG. 5 is a side elevational view of another embodiment of the invention.
Figure 6:
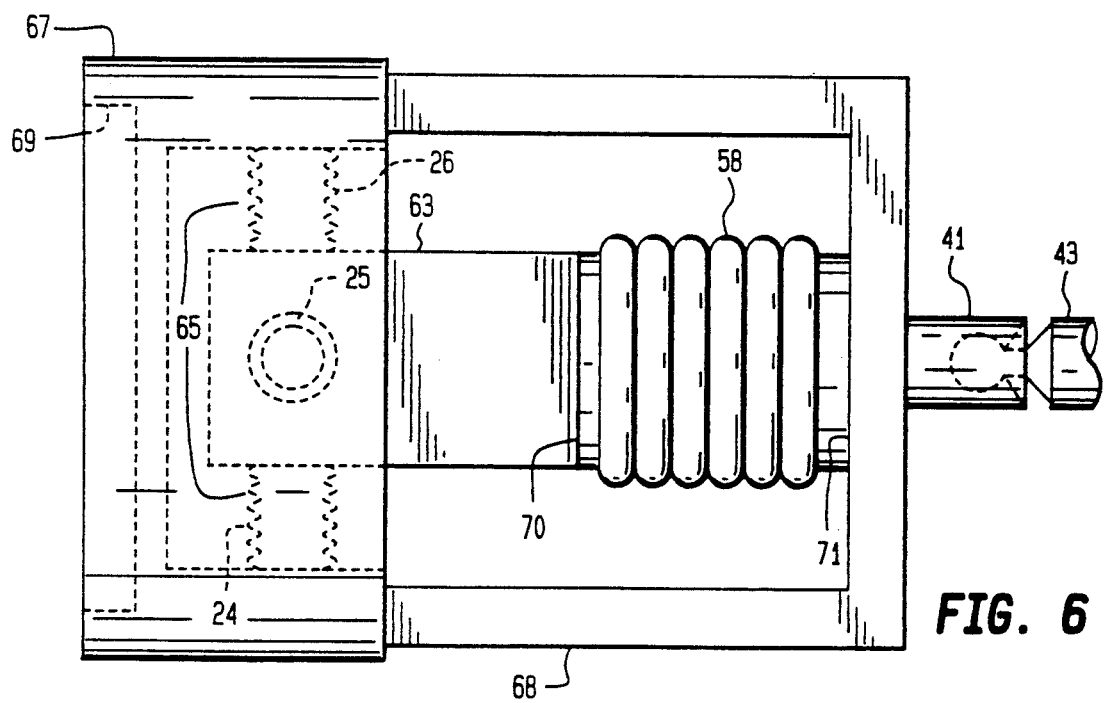
FIG. 6 is a top elevational view of the embodiment shown in FIG. 5.

Another embodiment 61 of the invention is illustrated in FIGS. 5 and 6. Portions of the embodiment 61 identical to those of the embodiment 51 bear identical reference numerals. A carriage 62 includes a cylindrical frame portion 63 supported above the base 14 by a pedestal portion 64. Outer portions of the frame portion 63 define an inner periphery of an annular, planar region 65. Disposed within the region 65 is an annular support dish 67 connected to the appendage 41 by a yoke member 68. The dish 67 has a central cavity 69 adapted to receive a mirror (not shown). Supporting the support dish 67 from the frame 63 are the bellows coupling elements 24-27 connected therebetween. Secured between the rear surface 70 of frame portion 63 and the inside surface 71 of yoke member 68 is bellows element 58.

The operation of the embodiment 61 is similar to that described above for the embodiments 10 and 51. However, in this case the movable support dish 67 moves in a region surrounding the frame 63 rather than in a region surrounded thereby as in the embodiments 10 and 51.

Obviously, many modifications and variations of the present invention are possible in light of the above teachings. It is to be understood, therefore, that the invention can be practiced otherwise than as specifically described.

What is claimed is:

1. An apparatus for constraining a device to parallel plane translational movement, said apparatus comprising:
   base means;
   frame means fixed to said base means and including frame portions defining a periphery of a region;
   movable means disposed in said region;
   a plurality of primary coupling elements supporting said movable means on said frame portions, each of said coupling elements being capable of bending motion and substantially incapable of twisting motion so as to prevent angular movement of said movable means about either of two mutually perpendicular spatial axes defining a given plane and thereby guide movement of said movable means along a path substantially perpendicular to said given plane and including a series of planes all oriented substantially parallel to each other.

2. An apparatus according to claim 1 wherein each of said coupling elements comprises an element portion extending in said given plane and capable of elongation and contraction.

3. An apparatus according to claim 2 wherein two of said element portions comprise rectilinearly projecting portions forming an angle less than 180°.

4. An apparatus according to claim 3 wherein said coupling elements comprise at least three coupling elements, and said coupling elements are arranged in an array symmetrical with respect to said region.

5. An apparatus according to claim 4 wherein said frame portions are distributed annularly around and aligned with said region, and said element portions extend radially between said region and said frame portions.

6. An apparatus according to claim 5 wherein said frame means is an annular frame enclosing said region.

7. An apparatus according to claim 3 wherein said frame portions are distributed annularly around and aligned with said region, and said element portions extend radially therebetween.

8. An apparatus according to claim 7 wherein said frame means is an annular frame enclosing said region.

9. An apparatus according to claim 3 wherein said region surrounds said frame portions, said frame portions are aligned with said region, and said element portions extend radially between said region and said frame portions.

10. An apparatus according to claim 9 wherein said movable means is annular and surrounds said frame means.

11. An apparatus according to claim 1 wherein each of said coupling elements comprises a bellows element having a longitudinal axis and being capable of bending motion and substantially incapable of twisting motion along said longitudinal axis.

12. An apparatus according to claim 11 wherein each longitudinal axis of each said bellows element is aligned with said given plane.

13. An apparatus according to claim 12 wherein said longitudinal axes of two of said bellows elements form an angle less than 180°.

14. An apparatus according to claim 13 wherein said coupling elements comprise at least three coupling elements, and said coupling elements are arranged in an array symmetrical with respect to said region.

15. An apparatus according to claim 14 wherein said frame portions are distributed annularly around and aligned with said region, and said element portions extend radially between said region and said frame portions.

16. An apparatus according to claim 15 wherein said frame means is an annular frame enclosing said region.

17. An apparatus according to claim 1 including auxiliary coupling means connected between said frame portions and said movable means so as to provide support thereof, said auxiliary coupling means being capable of bending motion and substantially incapable of twisting motion so as to prevent angular movement of said movable means about a third spatial axis perpendicular to said given plane.

18. An apparatus according to claim 17 wherein said auxiliary coupling means comprises a bellows having a longitudinal axis oriented parallel to said path and being capable of contracting and elongation bending motion and substantially incapable of twisting motion.

19. An apparatus according to claim 1 including a drive means coupled to said movable means and adapted to impart movement thereto.

20. An apparatus according to claim 19 including a drive coupling between said drive means and said movable means, and said drive coupling is adapted to permit angular movement of said drive means relative to said movable means.

21. An apparatus according to claim 20 wherein said drive coupling comprises a universal joint.

22. An apparatus according to claim 20 wherein said drive coupling comprises a ball and socket joint.

23. An apparatus according to claim 20 wherein said drive coupling comprises a serial combination of a universal joint and an axially twisting bearing.

24. An apparatus according to claim 19 wherein said drive means comprises a hinged parallelogram linkage.

25. An apparatus according to claim 1 wherein said movable means comprises a support adapted to retain a mirror.

* * * * *